US012462228B2

(12) United States Patent
Koutouvelis et al.

(10) Patent No.: US 12,462,228 B2
(45) Date of Patent: Nov. 4, 2025

(54) WIRELESS COMMUNICATION DEVICE ASSESSMENT SYSTEM

(71) Applicant: Green Panda Holdings Limited, Nicosia (CY)

(72) Inventors: Fotios Koutouvelis, Nicosia (CY); Nikos Tzamos, Nicosia (CY); Andreas Mourelatos, Nicosia (CY); Alexandros Didaskalou, Nicosia (CY)

(73) Assignee: GREEN PANDA HOLDINGS LIMITED, Nicosia (CY)

( * ) Notice: Subject to any disclaimer, the term of this patent is extended or adjusted under 35 U.S.C. 154(b) by 8 days.

(21) Appl. No.: 18/706,720

(22) PCT Filed: Nov. 1, 2022

(86) PCT No.: PCT/EP2022/080467
§ 371 (c)(1),
(2) Date: May 1, 2024

(87) PCT Pub. No.: WO2023/073248
PCT Pub. Date: May 4, 2023

(65) Prior Publication Data
US 2025/0131392 A1    Apr. 24, 2025

(30) Foreign Application Priority Data

Nov. 1, 2021  (GR) .............................. 20210100761
Jul. 6, 2022  (GB) .................................... 2209941

(51) Int. Cl.
G06Q 10/30    (2023.01)
G06Q 20/18    (2012.01)
G06Q 30/02    (2023.01)

(52) U.S. Cl.
CPC ............ *G06Q 10/30* (2013.01); *G06Q 20/18* (2013.01); *G06Q 30/0278* (2013.01)

(58) Field of Classification Search
None
See application file for complete search history.

(56) References Cited

U.S. PATENT DOCUMENTS 4,907,701 A * 3/1990 Kobayashi .............. B07C 5/344
                                                    209/939
6,748,296 B2 * 6/2004 Banerjee ................. G07F 9/002
                                                    700/241
(Continued)

FOREIGN PATENT DOCUMENTS

WO   WO-2011115857 A2 *  9/2011  ............. G06Q 10/30
WO   2016/053378 A1      4/2016
(Continued)

OTHER PUBLICATIONS

GB Combined Search and Examination Report for Application No. 2209941.0 dated Dec. 28, 2022.
(Continued)

Primary Examiner — Jacob C. Coppola
(74) Attorney, Agent, or Firm — Artegis Law Group, LLP

(57) ABSTRACT

Wireless communication device assessment system A system for assessing a wireless communication device, the system comprising an assessment area and an enclosure arranged to be substantially impenetrable by electromagnetic radiation, the system further arranged to transfer a wireless communication device between the assessment area and the enclosure, wherein the assessment area is arranged to illuminate the device and obtain an image of the device, and wherein the enclosure is arranged to allow communication with the wireless communication device placed within the enclosure to extract information pertaining to the device from a signal received from the device.

20 Claims, 4 Drawing Sheets

(56) References Cited

U.S. PATENT DOCUMENTS

| | | | | |
|---|---|---|---|---|
| 7,646,193 | B2* | 1/2010 | Suzuki | H04M 1/24 |
| | | | | 324/756.01 |
| 9,819,847 | B1* | 11/2017 | Edwards | H04N 23/56 |
| 11,385,184 | B2* | 7/2022 | Chehaiber | G06T 7/0004 |
| 11,922,467 | B2* | 3/2024 | Forutanpour | G06V 20/20 |
| 12,222,296 | B2* | 2/2025 | Van Olmen | G01N 21/85 |
| 2005/0235814 | A1* | 10/2005 | Diebold | F42B 33/06 |
| | | | | 86/50 |
| 2010/0228676 | A1* | 9/2010 | Librizzi | H04M 1/0287 |
| | | | | 705/306 |
| 2012/0191562 | A1* | 7/2012 | Bowles | G06Q 10/30 |
| | | | | 705/308 |
| 2013/0198144 | A1* | 8/2013 | Bowles | G06Q 50/00 |
| | | | | 707/668 |
| 2013/0311318 | A1* | 11/2013 | Librizzi | G06Q 10/00 |
| | | | | 705/308 |
| 2016/0284019 | A1* | 9/2016 | Bowles | G06Q 30/0278 |
| 2018/0084094 | A1 | 3/2018 | Sinha et al. | |
| 2018/0342050 | A1 | 11/2018 | Fitzgerald et al. | |
| 2019/0154599 | A1* | 5/2019 | Kaminski | G01N 23/18 |
| 2019/0325530 | A1* | 10/2019 | Bowles | H04M 1/0287 |
| 2020/0202319 | A1* | 6/2020 | Forutanpour | G06Q 20/18 |
| 2021/0116392 | A1 | 4/2021 | Fitzgerald et al. | |
| 2021/0192484 | A1* | 6/2021 | Forutanpour | G07F 7/06 |

FOREIGN PATENT DOCUMENTS

| | | | | |
|---|---|---|---|---|
| WO | 2017/081527 | A1 | 5/2017 | |
| WO | 2019/012305 | A1 | 1/2019 | |
| WO | WO-2022133498 | A1 * | 6/2022 | G06Q 30/06 |

OTHER PUBLICATIONS

International Search Report for Application No. PCT/EP2022/080467 dated Feb. 2, 2023.

* cited by examiner

WIRELESS COMMUNICATION DEVICE ASSESSMENT SYSTEM

CROSS-REFERENCE TO RELATED APPLICATIONS

The present application is a national stage application of the international application titled, "WIRELESS COMMUNICATION DEVICE ASSESSMENT SYSTEM," filed on Nov. 1, 2022 and having application number PCT/EP2022/080467, which claims priority to GR20210100761 filed Nov. 1, 2021 and GB2209941.0 filed Jul. 6, 2022. The subject matter of these related applications is hereby incorporated herein by reference.

TECHNICAL FIELD

This disclosure relates to assessing a wireless communication device. It is particularly suited, but by no means limited, to assessing mobile phones and tablets. The assessment can include both a physical assessment and a functional assessment.

BACKGROUND

There is a current movement towards recycling and re-using of electronic devices, which is in line with popular thinking in relation to sustainability, green processes and caring for the environment.

In order to promote recycling and re-use, a device user often wishes to upgrade or receive payment for their unwanted device. Otherwise, that device is likely to end-up being discarded and eventually being thrown into a non-environmentally friendly landfill site.

Accordingly, it is desired to provide a system that is convenient for both the user and the retailer so that devices can be assessed physically and/or functionally, enabling them to be diverted away from being discarded and either remaining in use or being recycled in an environmentally-friendly manner.

SUMMARY

According to an aspect there is provided a system for assessing a wireless communication device as defined in claim 1. The system comprising an assessment area, and an enclosure arranged to be substantially impenetrable by electromagnetic radiation. The system arranged to transfer a wireless communication device between the assessment area and the enclosure, wherein the assessment area is arranged to illuminate the device and obtain an image of the device, and wherein the enclosure is arranged to allow communication with the wireless communication device placed within and sealed into the enclosure to extract information pertaining to the device from a signal received from the device.

Optionally, the system being arranged to transfer a wireless communication device between the assessment area and the enclosure comprises a receptacle for receiving the wireless communication device.

Optionally, the receptacle comprises a tray.

Optionally, the system being arranged to transfer comprises a motor, belt and pulley arrangement to move the receptacle between the assessment area and the enclosure.

Optionally, the system is further arranged such that a blockage in the transfer of the receptacle between the assessment area and the enclosure is detectable based on the current drawn by the motor when operating.

Optionally, the assessment area comprises at least one LED array to illuminate the wireless communication device.

Optionally, the at least one LED array is arranged to at least partially surround the wireless communication device when located on the receptacle in the assessment area.

Optionally, two LED arrays are arranged in arcs around the wireless communication device when located on the receptacle in the assessment area.

Optionally, each LED is individually addressable to provide illumination tailored for the wireless communication device.

Optionally, the assessment area comprises a camera positioned above and a camera positioned below the wireless communication device when located on the receptacle in the assessment area to obtain an image of the device Optionally, at least one LED is an infra-red LED and one of the cameras is an infra-red camera.

Optionally, the system further comprises software to communicate with the wireless communication device to control aspects of the device when the device is in the assessment area.

Optionally, the assessment area further comprises at least one microphone and at least one speaker.

Optionally, the enclosure being arranged to allow communication with the device comprises at least one antenna positioned inside the enclosure.

Optionally, the enclosure is sized less than 30 cm×30 cm×15 cm.

Optionally, the enclosure is sized less than 30 cm×30 cm×20 cm.

Optionally, a portion of the receptacle for receiving the wireless communication device is sized so as to close an aperture of the enclosure when the receptacle is transferred to the enclosure such that the enclosure is sealed when the wireless communication device is positioned inside the enclosure.

Optionally, the enclosure comprises electromagnets to seal the enclosure with the receptacle.

According to another aspect there is provided a method of assessing a wireless communication device, the method comprising placing a wireless communication device in the system of the first aspect, assessing the device condition when it is disposed within the assessment area by illuminating the device and obtaining an image of the device, transferring the device between the assessment area and the enclosure, initiate communication with the device when it is placed within the enclosure to extract information pertaining to the device from a signal received from the device.

Optionally, the method further comprising the step of placing the device on the receptacle.

Optionally, the method further comprising the step of verifying the device is display screen uppermost when on the receptacle.

Optionally, the method further comprising the step of illuminating the device in the assessment area with the at least one LED array.

Optionally, the method further comprising the step of imaging the device with cameras.

Optionally, the method further comprising the step of entering a browser address on the device causing the device to display a QR code Optionally, the method further comprising the step of connecting to the device and controlling device functionality Optionally, the method further comprising the step sending images captured to a remote assessment centre Optionally, the method further comprising the step of creating a composite image of at least some of the images captured.

Optionally, the method further comprising the step of transferring the device to the enclosure on the receptacle.

Optionally, the method further comprising the step of sealing the device in the enclosure on the receptacle.

Optionally, the method further comprising the step of extracting information pertaining to the device by sending a signal to and receiving a signal from the device.

Optionally, the method further comprising the step of determining a condition of the device based on the assessment of function, appearance and the information pertaining to the device.

BRIEF DESCRIPTION OF THE DRAWINGS

Embodiments will now be described, by way of example only, and with reference to the drawings in which.

In the figures, like elements are indicated by like reference numerals throughout.

DETAILED DESCRIPTION

Figure 1:
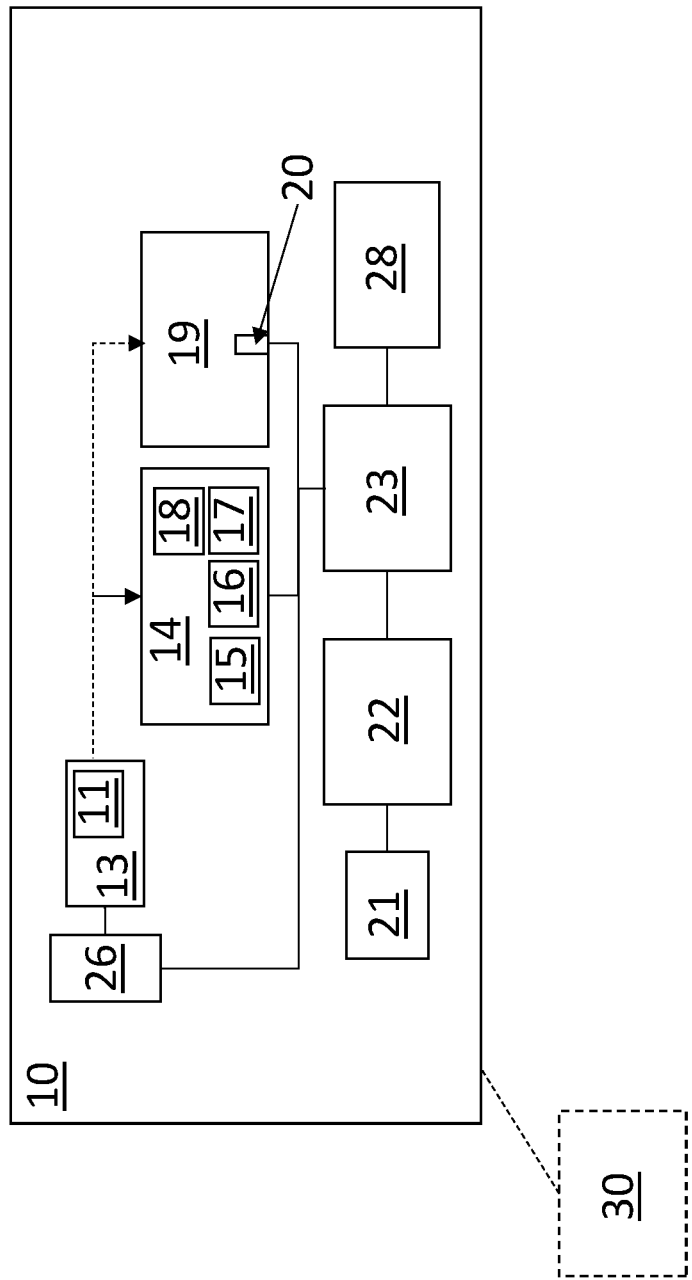
FIG. 1 illustrates a system for assessing a wireless communication device according to an example.

With reference to FIG. 1, a system 10 for assessing a wireless communication device 11 is illustrated. The system comprises a device receptacle 13 for receiving the wireless communication device 11 under assessment. The assessment is both physical and functional by way of assessment area 14 and enclosure 19. Assessment area 14 comprises at least one camera 15 which may have an auto-focus function, at least one microphone 16, at least one speaker 17 and at least one LED array 18. Enclosure 19 is arranged to be substantially impenetrable by and impervious to electromagnetic radiation, preferably in the form of a faraday cage, such that the enclosure blocks any external electromagnetic signals from entering the enclosure, thus shielding or isolating the interior of the enclosure from external electromagnetic radiation, specifically electromagnetic radiation at the frequencies typical of mobile phone usage. Enclosure 19 further comprises at least one antenna 20 for communicating with wireless communication device 11 when it is inside the enclosure.

The enclosure may be dimensioned at 40 cm×40 cm×15 cm or less, the length, width and depth measurements being interchangeable. Typically, the enclosure may be 28 cm length×13 cm width×24 cm depth. The enclosure is sized so as to be able to enclose a typical wireless communication device such as a mobile phone or tablet. Preferably, the enclosure is a one-piece assembly of metal which may be steel and which may be welded together to form the enclosure, and that does not require any screws or nuts and bolts for construction. This increases the level of EM shielding that is provided. The thickness of the enclosure is preferably about 3 mm but may be 1.25 mm or greater.

Examples of possible materials suitable for providing EM shielding and insulating the enclosure against transmission therethrough of electromagnetic radiation include:

magnetic wood panelling;

a layer of conductive material, such as nickel-zinc ferrites sandwiched between two wooden panels;

metallic wire mesh: a metallic wired mesh forming a Faraday cage placed inside another material;

conductive glass: specifically prepared glass that behaves as a metal conductor in the absence of metallic meshes;

adhesive window shielding: thin adhesive metal-based meshes that adhere to glass retaining a high degree of transparency;

paint: infused (EM) paint with conductive particles, such as halloysite (nanotubes coated with copper) can be used to coat regular materials;

microwave-like shielding fabric: a stretchy silver coated sheer nylon weave used to coat the interior of both windows and regular material;

metallised fabrics: fibres of metals such as copper and nickel are blended or woven together in layers to create flexible shielding surfaces that can applied throughout the interior of the enclosure.

The system further comprises processor 22 coupled to controller 23 and storage device 21. The processor, controller and storage device act to control the various functions of the system as will explained in more detail below. The processor, controller and storage device may be comprised in a PC or other computing device which can be local to the system 10 or remote and connected by a network as would be understood. System 10 may comprise network connection (wired or wireless) for the sending of data captured by the system to a remote assessment centre 30 for processing of the data.

The controller may comprise at least one of:

An off-the-shelf base station controller, such as those currently available and used to control base stations in existing cellular communication networks.

A computer running software that emulates the functionality of a base station controller.

A link to a cellular network operator's existing base station or network of base stations such that the transceiver is controlled thereby.

Figure 2:
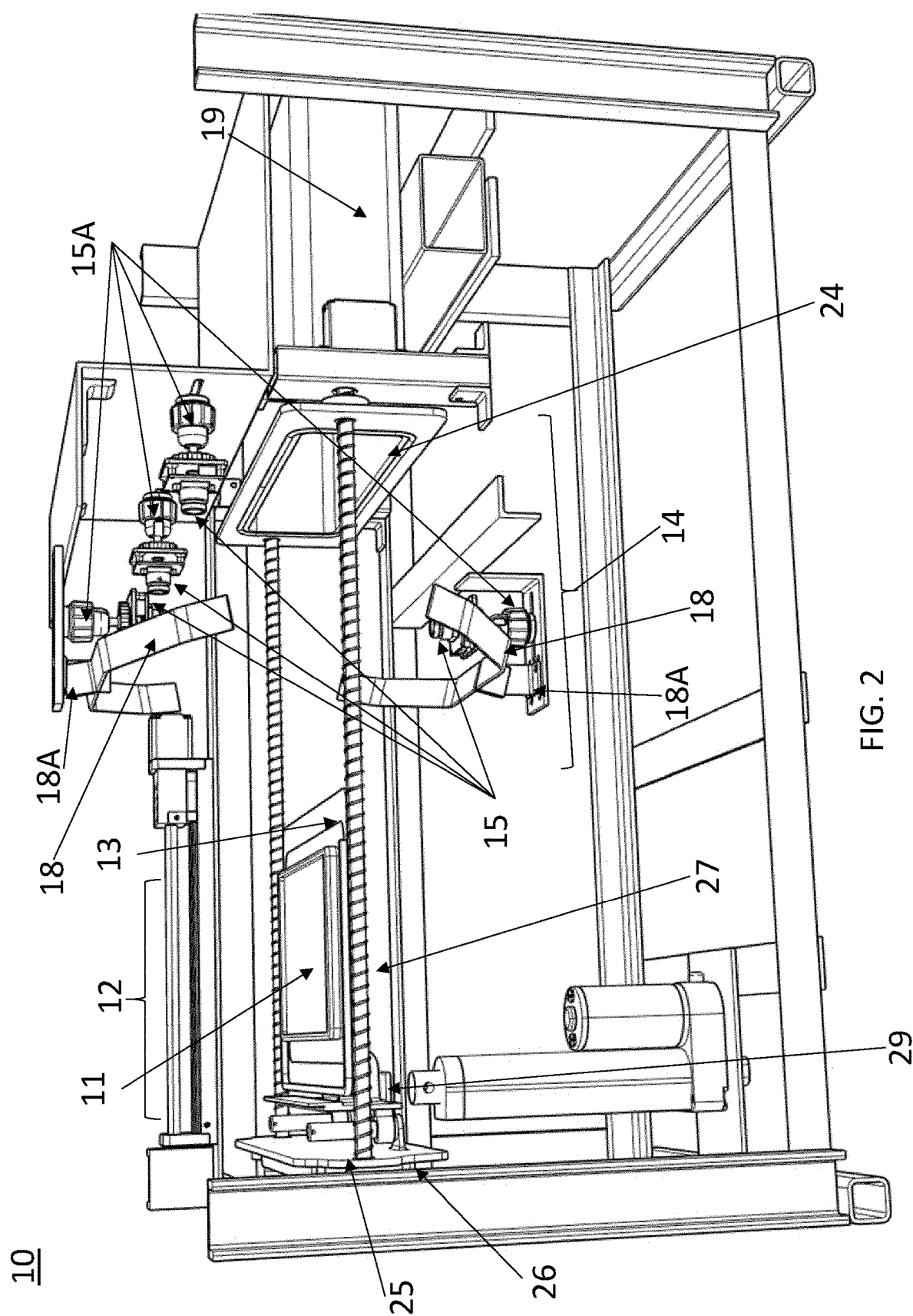
FIG. 2 illustrates a system for assessing a wireless communication device according to an isometric view of an example.

Custom hardware such as a programmable logic device (PLD) or field programmable gate array (FPGA) configured to emulate the functionality of a base station controller With reference to FIG. 2, the system 10 for assessing a wireless communication device 11 is shown in isometric view. The system further comprises an entry point of the device 11 into the system, for example in the form of aperture 12. Proximal aperture 12 is positioned device receptacle 13. Once a device has entered the system through aperture 12, the device 11 resides on receptacle 13. The system may comprise a slide (not shown) or other arrangement so that a device entering the system through the aperture 12 finally resides on the receptacle 13. Receptacle 13 may comprise a tray which is preferably transparent such that a back side of the device can be viewed from the underside of the receptacle. As mentioned in relation to FIG. 1, system 10 also comprises an assessment area 14. The assessment area comprises at least one camera 15, and at least one LED array 18 and optionally at least one microphone 16, and optionally at least one speaker 17 with corresponding mounts 15A-18A. The mounts may be arranged to move in multiple directions, such as a ball and socket or hinge joint, so as to alter the angle of mounting of the respective camera, LED array, microphone, speaker etc. In FIG. 2, only camera(s) 15 and LED array(s) 18 and their corresponding mounts 15A and 18A are shown for clarity.

The assessment area is arranged so that the at least one camera 15 can image the device under assessment, the at least one microphone 16 can detect audio signals from the device under assessment, the at least one speaker can send audio signals to the device under assessment, and the at least one LED array can illuminate the device under assessment.

The at least one LED array is arranged to at least partially surround the wireless communication device 11 when it is located on the receptacle and the receptacle is positioned in the assessment area 14. Two LED arrays may be positioned in arcs within the assessment area such that the LED arrays at least partially surround a wireless communication device located on the receptacle in the assessment area. Each LED may be individually addressable such that illumination by the LEDs can be tailored to any device and to provide any form of illumination as required when assessing the device. Some of the LEDs may be infra-red and/or UV LEDs, or there may be additional LED arrays comprising infra-red and/or UV LEDs. The LED arrays may be organised as a series of one or more flat panel arrays. Any other suitable form of illumination may be used such as standard incandescent or halogen bulbs. The screen of the device under assessment may also be used to aid the illumination.

The at least one camera 15 preferably comprises at least one camera positioned above the receptacle and a camera positioned below the receptacle when the receptacle is positioned in the assessment area. Further preferably a plurality of cameras are positioned above the receptacle for imaging the front side of the device 11. Still further preferably, three cameras are positioned above the receptacle and one camera is posited below the receptacle. One or more of the cameras may be an infra-red and/or a UV camera. By using IR and/or UV illumination and a corresponding camera, any effect of the glare of the device screen on captured images can be avoided. Further, with UV illumination and a UV camera, cleanliness of the device can be assessed, with substances on the device being visible in captured images.

The assessment area peripherals (15-18) allow physical examination of the device under assessment.

System 10 further comprises a display screen (28) coupled to processor 22 and/or controller 23 for displaying images captured by any of the cameras installed. This allows a local operative to verify that the device under assessment is correctly positioned for assessment, for example is positioned with the display facing uppermost and is in the field of view of the at least one camera.

Enclosure 19 includes an aperture 24 by which receptacle 13 can enter the enclosure. Receptacle 13 further includes a portion 25 sized so as to close the aperture 24 of the enclosure 19 when the receptacle is fully entered into the enclosure 19. Illustrated in FIG. 2 is a portion at 90 degrees to the receptacle which is sized to close aperture 24 of the enclosure. Other arrangements would be suitable such as a different portion of the receptacle forming an aperture closing function in order to seal the enclosure.

Alternative embodiments may comprise the receptacle 13 and portion 25 being separate and not coupled together. In such an embodiment, when the receptacle is fully entered into the enclosure, the portion 25 is independently moved to close aperture 24 of the enclosure. In an alternative embodiment, enclosure 19 may comprise a plurality of separate parts forming the enclosure that are arranged to be moved into position around the receptacle 13 such that the enclosure surrounds the receptacle.

Enclosure 19 includes at least one further aperture (not shown) through which the at least one antenna 20 is fed. This enables wireless communication signals to be injected into the enclosure, such signals being provided by the controller and processor of the system and being independent from any external cellular communication signals such as GSM, CDMA and the like.

As can be seen from the example of FIG. 2, the assessment area and the enclosure may be positioned separately from one another. System 10 is further arranged to transfer the receptacle and hence any device positioned on the receptacle between the assessment area 14 and the enclosure 19. For example, at least one motor 26 and a threaded shaft 27 are arranged such that operation of the motor serves to move the receptacle between the assessment 14 area and the enclosure 19. In another example, a motor 26 together with a belt and pulley (not shown) may be arranged to provide the same movement of the receptacle between the assessment area 14 and the enclosure 19.

Receptacle 13 may be moved vertically up and down (towards and away from the aperture 12) by way of a motor and one or more linear bearings (not shown). Action of the motor forces a cam mechanism (not shown) to contact the receptacle to displace the receptacle upwards along the axis of the linear bearings towards aperture 12. The movement may be approximately 7 cm. By rotating the motor in the opposite direction, the cam mechanism loses contact with the receptacle 13, and the receptacle moves downwards away from aperture 12.

System 10 may comprise a further motor (not shown) arranged to keep receptacle 13 horizontal for assessment purposes, but also arranged to displace receptacle 13 away from the horizontal about hinge 29 such that device 11 is able to slide into a bucket or other repository (not shown) internal to system 10.

By providing a receptacle that comprises a portion to seal the enclosure, the device under assessment does not need to be moved from its initial position on the receptacle throughout its journey from aperture, to assessment area to enclosure, or aperture to enclosure to assessment area. This enables the construction of the system to be simplified with fewer moving parts.

In general, the construction and assembly of system 10 is such that the components of the assessment area 14, enclosure 19 and transfer mechanism are arranged to be easily accessible for maintenance without requiring substantive disassembly of the system. The motors of the system may be servomotors comprising position and current control.

In operation, the receptacle may have an initial position near the aperture 12 so that a wireless communication device 11 can be placed on the receptacle 13 through the aperture 12.

Once a device is positioned on the receptacle, the controller 23 operates the at least one motor 26 to move the receptacle to the assessment area, if required. The aperture and the assessment area may be positioned such that movement is not required between an initial position of the receptacle and the assessment area 14. The controller 23 may sense the current being drawn by the motor to detect any blockage in the movement of the receptacle to avoid system malfunction. Further the motor comprises accurate position control so that the controller knows where the motor has moved the receptacle to. Optionally, the motor may comprise an output signal fed to the controller to report any error in its operation such as a blockage, over current situation or any other issue with the operation of the motor.

The receptacle reaches a docking position in the assessment area where the at one LED array 18 is positioned to suitable illuminate the device under assessment. The at least one camera can be used to capture one or more images of the position of the receptacle to confirm via display 28 whether the receptacle is in the correct position for assessment, that is to say that the receptacle is positioned so that the viewing window of the one or more cameras is able to capture images useful for assessing device condition. Alternatively, confirmation of the correct positioning of the device can be carried out by a remote assessment centre 30 after images captured by the camera have been sent to the centre 30. The remote assessment centre 30 may be operated by a human or artificial intelligence utilising machine learning algorithms, computer vision, and/or edge detection. Composite images comprising the images captured by the cameras 15, 151-154 can be used at the remote assessment centre 30 to detect specific blemishes as described earlier. Anomalies can be detected by way of layered verification where multiple images are layered on top of one another to eliminate imaging artefacts that are not present on all images of the device such as glare or shadowing that causes the appearance of an erroneous blemish.

The controller 23 operates the at least one LED array (which may include individually addressable LEDs) to allow the at least one camera 15 to view the device 11 and capture images that are stored in storage device 21. The at least one LED array is arranged so that by way of at least partially surrounding the device under assessment, any cracks, marks or other blemishes on the device case or screen can be seen on the captured images. The controller is operable to automatically gather images of the device using lightning from different angles so that, in effect, an image can be captured of the device using illumination from 360 degrees around the device. With the preferable plurality of cameras 15 positioned above the device and the multitude of different lighting angle available from the at least one LED array, different reflections and angles are obtainable for the captured images so that even the most subtle of cracks to a screen or case can be identified on the captured images. This is due to light bouncing of a scratch or crack differently depending on the angle of incidence of the light as would be understood. A composite image of all blemishes on the device may be produced from the images captured by the cameras and stored.

Figure 3:
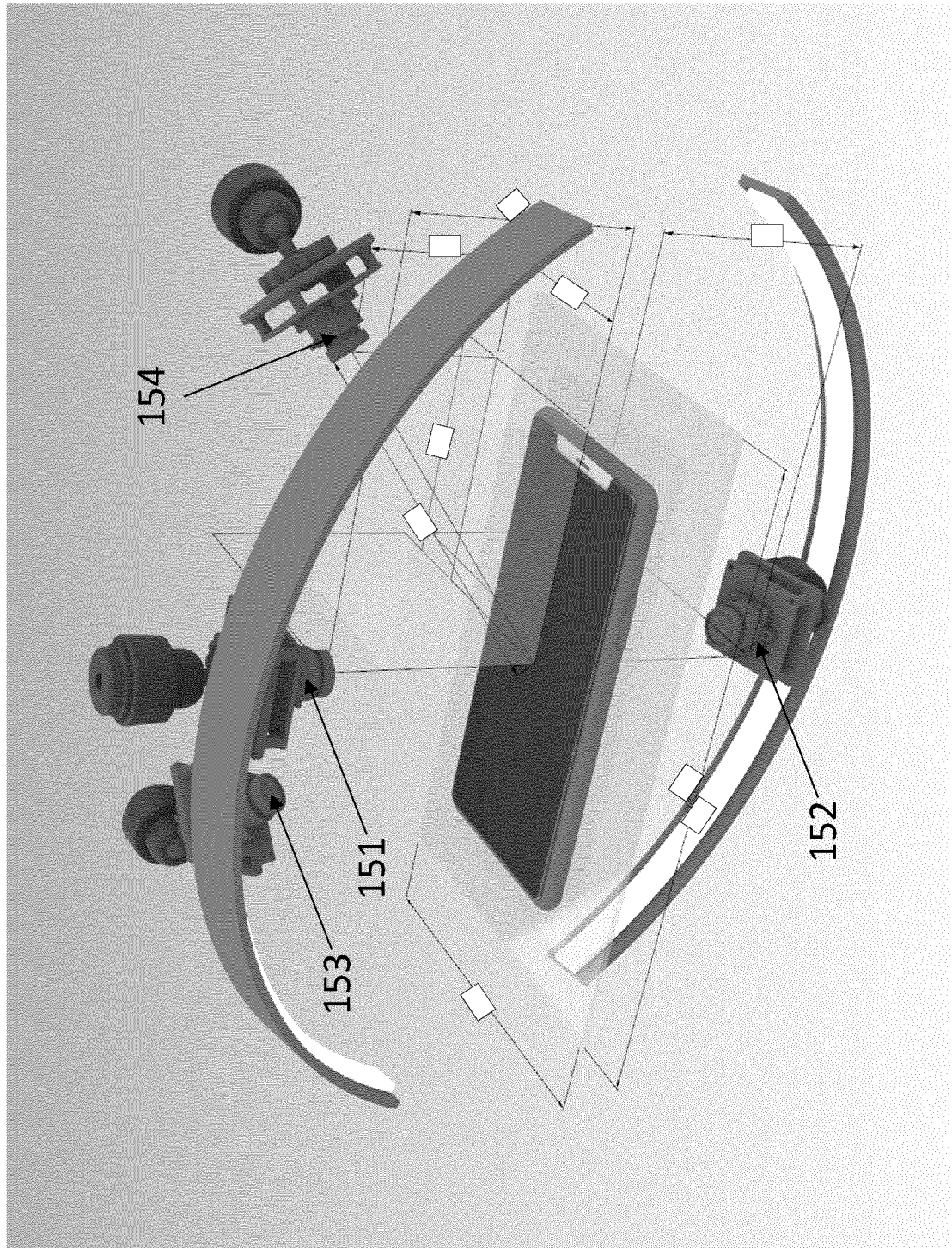
FIG. 3 illustrates camera mounting positions according to an example.

For example, with the optimal arrangement of three cameras the system comprises top (151) and bottom (152) cameras plus two (153, 154) positioned at angles above the receptacle as shown in FIG. 3. Example positions of LED arrays 18 (different to those in FIG. 2) are also shown in FIG. 3. The LED arrays may be angled towards or away from the various cameras using the respective mounts 18A (not shown in FIG. 3).

Further, the at least one LED array may be divided into zones to implement illumination from different angles. The LEDs opposite the camera that is imaging may be turned off to avoid glare.

The composite image may comprise only certain illumination (for example visible, IR UV light) or a combination of one or more different types of illumination.

With the above described arrangement of cameras and LED illumination, the following blemishes can be imaged by the cameras: screen scratches and cracks, frame scratches and cracks, back cover scratches and cracks, water damage, battery swelling, frame bending, damage such as scratches to camera lenses of the device.

For example, with the optimal arrangement of three cameras above (151, 513, 154) the receptacle and one camera below (152), the state of the device's screen as well as any disfiguration of the frame around the screen are captured by the above cameras. Battery swelling or bending of the device can also be captured by way of one or more of the cameras (151, 153, 154) above the receptacle being mounted to the side of the receptacle to obtain a different viewing angle. The camera (152) mounted below the receptacle is for imaging the device's back cover through the transparent portion of the receptacle.

System 11 may comprise software to communicate with the wireless communication device to control aspects of the device when the device is in the assessment area.

The software may be in the form of a web app. The software is able to communicate with device using standard cellular communication signals from the device's home network as per normal cellular device use, or from a local wifi signal as would be understood. Such a wifi signal may be provided by system 10.

For assessment, the user of the device enters an address in the device's browser which instructs the device to display a QR code on its screen. After the device has been correctly placed on the receptacle, and the receptacle is in the correct assessment position, one of the cameras scans the QR code displayed on the device's screen. The system then connects to the device and is able control device functions. Connection to the device may take place by way of a bidirectional, persistent WebSocket connection being established between the device and the system through a process known as the WebSocket handshake. Through such a connection the system can communicate with the web app of the device. The software on the device may receive commands and execute them.

The software is able to command the device to flash the screen with both a white display and any colour for the imaging of LCD discolouration, blemishes and blurring with camera(s) 15. The software may also be able to control cameras, take photos and send them to the system 10 for assessment either on local display 28 or at remote assessment centre 30.

Optionally, the assessment area 14 of system 11 also comprises at least one microphone 16 and at least one speaker 17, each controllable by controller 23.

The software can also command the device to output audio through any onboard speakers for detection by the at least one microphone 16 to assess device speaker performance. The device may also be commanded to listen for audio output by the at least one speaker 17, and optionally play it back to assess device microphone performance. Any results of these tests can be stored in storage device 21.

Images and other assessment data such as audio information stored in the storage device can be viewed by an operative in order to make a conclusion as to the physical and functional state of the device under assessment at a remote site.

Assessment of a device can still take place if the device cannot be switched on, or if a network connection cannot be established with the device, however, as would be appreciated, less functionality of the device could be checked in this instance. As discussed above, a full physical assessment can take place in the assessment area using the various cameras and illumination, for any kind of device or item under assessment. Blemishes such as cracks, scratches, dents, discoloration and factory imperfections i.e. manufacturing issues are all detectable in the resulting captured images.

As well as assessing the physical state of a device and non-telephonic functional aspects of the device, system 11 can also assess the state of the communication capability of the device and extract information pertaining to the device. For this, the receptacle is moved between the assessment area and the enclosure by the motor 26 as previously described. As previously mentioned, receptacle 13 includes a portion 25 sized so as to close the aperture 24 of the enclosure 19 when the receptacle is fully entered into the enclosure 19. As the receptacle moves towards the enclosure, for example on threaded shaft 27 as shown in FIG. 2 or using a belt and pulley arrangement, the receptacle enters the enclosure and portion 25 seals aperture 24 such that the enclosure is substantially impenetrable by electromagnetic radiation.

An electromagnet positioned in or on the enclosure (not shown) may be operable by controller 23 for ensuring portion 25 seals aperture 24 and remains in position throughout any testing. Enclosure 19 and/or portion 25 may comprise electromagnetic sealed gaskets to aid sealing of the portion 25 in aperture 24. Alternatively or additionally, motor 26 can remain providing a force on portion 25 after movement of receptacle 13 to enter enclosure 19, to aid the sealing of portion 25 in aperture 24.

Controller 23 is operable to produce signals mimicking a radio cell of a cellular communications network within the enclosure via antenna 20. Such a cell may be considered to be a microcell, picocell or femtocell. Such a cell provides much of the same functionality as a typical base station but in a much smaller scale whilst allowing self-contained deployment. The cell can be connected to a service provider, e.g. through an internet connection. The cell is capable of supporting, i.e. registering with and connecting a wireless communication device. Owing to the enclosure being impermeable to electromagnet radiation, the cell is contained within the enclosure and does not affect standard external cellular signals.

By being positioned in the enclosure, the telephony system of a wireless device 11 is forced to connect to the cell generated within the enclosure.

The cell generated within the enclosure is arranged so as to carry out a registration or handshake protocol with the wireless communication device, comprising authentication and authorization processes between the device and the cell, so as to allow and affect the registration and connection of the device with the cell within the enclosure. In the protocol, signals are exchanged between the device and the cell which are representative of information pertaining to the device.

During the registration process, a registration signal is sent to the device within the enclosure which informs the device of the cell's presence and effects the initiation of the registration of the device with the cell. Upon receipt of the registration signal from the antenna 20, the device sends a response signal which is received by the cell. During the transmission and receipt of signals between the device and the cell to effect the registration of the device with the cell, two pieces of information pertaining to the device are passed from the device to the cell.

One of these pieces of information is the International Mobile Subscriber Identity (IMSI). This is a unique number that is associated with GSM and UMTS device users. This number is stored in the SIM card of the device and is itself comprised of three parts:
  i) Mobile Country Code (MCC): a three digit code identifying the country in which the user's network operator belongs to;
  ii) Mobile Network Code (MNC): a two or three digit code identifying the user's network operator; and
  iii) Mobile Station Identification Number (MSIN): a code that uniquely identifies the user within the operator's customer base.

The other piece of information pertaining to the device that is transmitted from the device to the cell is the International Mobile Equipment Identity (IMEI) number. This is a unique number that identifies the specific handset of the user's device. This number itself consists of several parts, one of which, the Type Allocation Code (TAC), contains a unique identifier of the device's model.

The IMSI and IMEI information contained in the signal sent from the device to the cell is extracted by processor 22 which is in communication with the controller 23 forming the cell. The extracted information can thereafter be stored in data storage device 21. The data storage device may additionally store a database of IMSI, MCC, MNC, MSIN, IMEI and TOC numbers cross-referenced with respective names of mobile network operators and details concerning the device handset. The database is thus used so as to determine, from the extracted information, which mobile network operator the user currently has as well as details concerning the user's device handset.

Accordingly, based on the signals received from the device within the enclosure, the IMSI and IMEI numbers can be automatically extracted and then used to identify, determine and collect additional information such as:
  the mobile network that the user is currently subscribed to;
  the brand and model of the user's mobile device;
  the capabilities of the mobile device e.g. storage capacity, CPU, GPU, RAM, battery spec, NFC capable, no. of cameras, speakers, microphones etc.
  a unique code to identify the user.

With such further information, which is also stored, a device retailer would be able to provide the user with individually customised information and bespoke upgrade offers, for example, offers which are dependent on the user's current network and the user's current brand and model of device.

In an alternative embodiment, during the registration process of the wireless device with the cell within the enclosure, once the device has transmitted its MNC and the devices current home network operator has been determined, this information is used by the cell so as to emulate a base station having the parameters necessary in order to correspond to a base station of the user's current network operator. By doing so, advantageously, a network or SIM locked device would be able to register and connect within the emulated cell within the enclosure.

Following the registration process, the device can register and be connected with the cell within the enclosure. Thereby, communication can be initiated with a device via the cell within the enclosure and messages can be freely transmitted directly to the device from the cell, without requiring the user's device phone number.

Dependent on the physical and functional assessment results, a condition of the device can be determined. This condition can be used by a retailer to make an offer to the user of the device, for example an upgrade to a different device, or a value of the device for payment to the user. Alternatively, or in addition, the device may be selected for recycling.

Subsequent to the condition of a device being confirmed, the images that allowed the confirmation can be fed into artificial intelligence and machine learning algorithms either at the assessment centre 30 or on board the system 10 to train an AI model with image, condition and valuation data.

Figure 4:
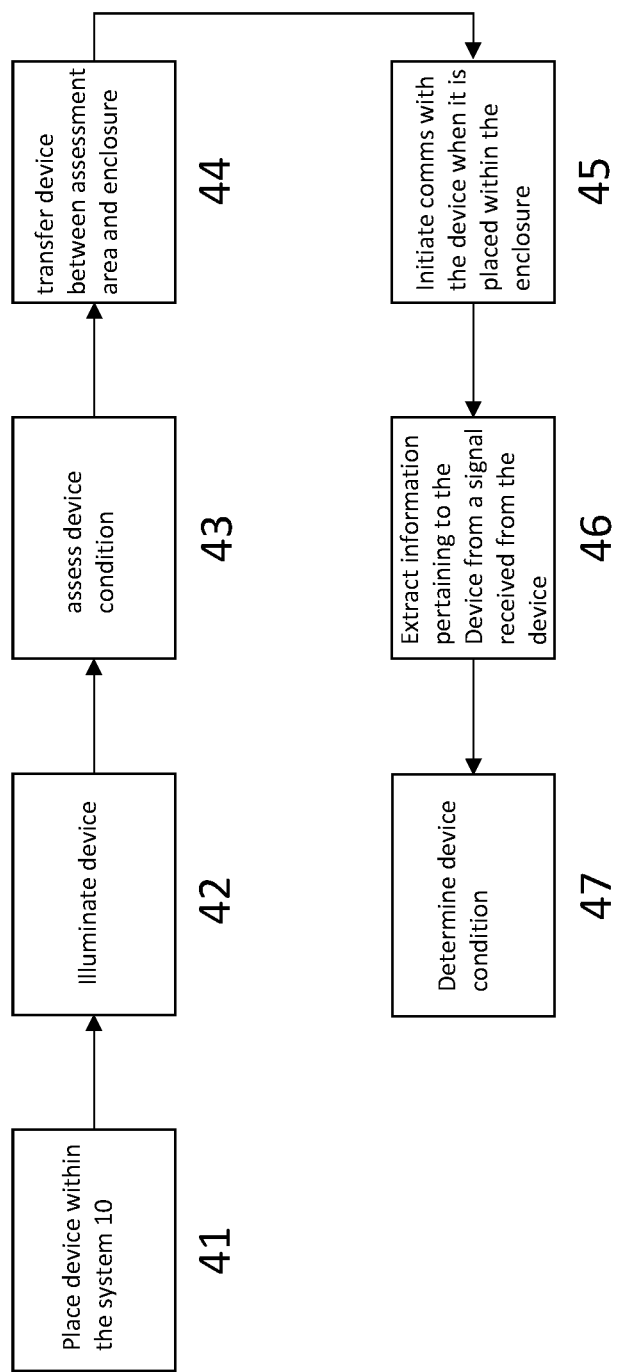
FIG. 4 illustrates steps of a method of assessing a wireless communication device according to an example.

FIG. 4 illustrates steps of a method of assessing a wireless communication device using the system 10. At step 41, the device is placed within the system 10, for example in receptacle 13. The device is illuminated when in the assessment area 14 at step 42. Device condition is assessed at step 43. This can include taking one or more images of the device. At step 44 the device is transferred between the assessment area 14 and enclosure 19. Steps 45 and 46 initiate communication with the device once it is placed within the enclosure, and extract information pertaining to the device respectively. At step 47, a condition of the device is determined based on the assessment of function, appearance and the information pertaining to the device.

The steps above may be carried out in a different order such that the steps associated with assessment of device condition may be carried out after the steps associated with extracting information pertaining to the device of steps 45 and 46.

The various methods described above may be implemented by a computer program product. The computer program product may include computer code arranged to instruct a computer or processor to perform the functions of one or more of the various methods described above. The computer program and/or the code for performing such methods may be provided to an apparatus, such as a computer or a processor, on a computer readable medium or computer program product. The computer readable medium may be transitory or non-transitory. The computer readable medium could be, for example, an electronic, magnetic, optical, electromagnetic, infrared, or semiconductor system, or a propagation medium for data transmission, for example for downloading the code over the Internet. Alternatively, the computer readable medium could take the form of a physical computer readable medium such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

An apparatus such as a computer or processor may be configured in accordance with such code to perform one or more processes in accordance with the various methods discussed herein. Such an apparatus may take the form of a data processing system. Such a data processing system may be a distributed system. For example, such a data processing system may be distributed across a network.

The invention claimed is:

1. A system for assessing a wireless communication device, the system comprising:
    an assessment area; and
    an enclosure arranged to be substantially impenetrable by electromagnetic radiation;
    the system further arranged to transfer a wireless communication device between the assessment area and the enclosure; wherein
    the assessment area is arranged to illuminate the device and obtain an image of the device; and wherein
    the enclosure is arranged to allow communication with the wireless communication device placed within and sealed into the enclosure to extract information pertaining to the device from a signal received from the device.

2. A system as claimed in claim 1 wherein the system being arranged to transfer a wireless communication device between the assessment area and the enclosure comprises a receptacle for receiving the wireless communication device.

3. The system of claim 1 wherein the system being arranged to transfer comprises a motor, belt and pulley arrangement to move the receptacle between the assessment area and the enclosure.

4. The system of claim 2 further arranged such that a blockage in the transfer of the receptacle between the assessment area and the enclosure is detectable based on the current drawn by the motor when operating.

5. The system of claim 1 wherein the assessment area comprises at least one LED array to illuminate the wireless communication device.

6. The system of claim 5 wherein the at least one LED array is arranged to at least partially surround the wireless communication device when located on the receptacle in the assessment area; and optionally wherein two LED arrays are arranged in arcs around the wireless communication device when located on the receptacle in the assessment area.

7. The system of claim 5 wherein each LED is individually addressable to provide illumination tailored for the wireless communication device.

8. The system of claim 1 wherein the assessment area comprises a camera positioned above and a camera positioned below the wireless communication device when located on the receptacle in the assessment area to obtain an image of the device; and optionally wherein at least one LED is an infra-red LED and one of the cameras is an infra-red camera or wherein at least one LED is a UV LED and one of the cameras is a UV camera.

9. The system of claim 1 further comprising software to communicate with the wireless communication device to control aspects of the device when the device is in the assessment area.

10. The system of claim 1 wherein the enclosure being arranged to allow communication with the device comprises at least one antenna positioned inside the enclosure.

11. The system of claim 2 wherein a portion of the receptacle for receiving the wireless communication device is sized so as to close an aperture of the enclosure when the receptacle is transferred to the enclosure such that the enclosure is sealed when the wireless communication device is positioned inside the enclosure.

12. A method of assessing a wireless communication device, the method comprising:
    placing a wireless communication device in the system of claim 1;
    assessing the device condition when it is disposed within the assessment area by illuminating the device and obtaining an image of the device;
    transferring the device between the assessment area and the enclosure;
    initiating communication with the device when it is placed within the enclosure to extract information pertaining to the device from a signal received from the device.

13. The method of claim 12 further comprising the step of verifying the device is display screen uppermost when on the receptacle.

14. The method of claim 12 further comprising the step of illuminating the device in the assessment area with the at least one LED array.

15. The method of claim 12 further comprising the step of imaging the device with at least one camera.

16. The method of claim 12 further comprising the step of entering a browser address on the device causing the device to display a QR code.

17. The method of claim 12 further comprising the step of connecting to the device and controlling device functionality.

18. The method of claim 12 further comprising the step of creating a composite image of at least some of the images captured.

19. The method of claim 12 further comprising the step of extracting information pertaining to the device by sending a signal to and receiving a signal from the device.

20. The method of claim 12 further comprising the step of determining a condition of the device based on the assessment of function, appearance and the information pertaining to the device.

\* \* \* \* \*